Sept. 30, 1924.  1,509,938
J. L. G. DYKES
PROCESS FOR MAKING RUBBER TIRE ARTICLES AND THE LIKE
Filed Sept. 25, 1919    6 Sheets-Sheet 2
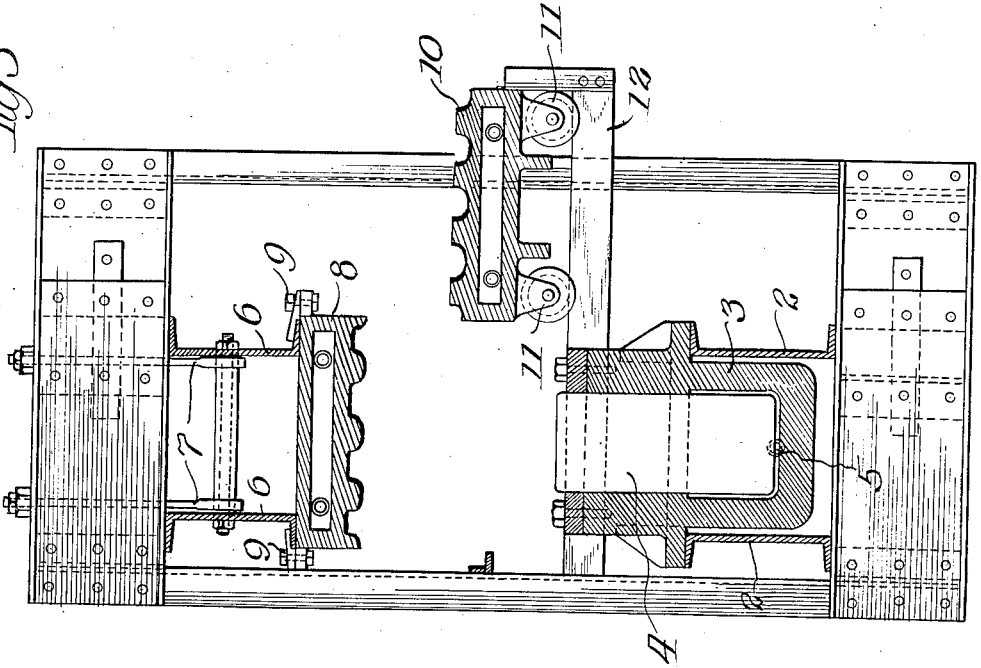
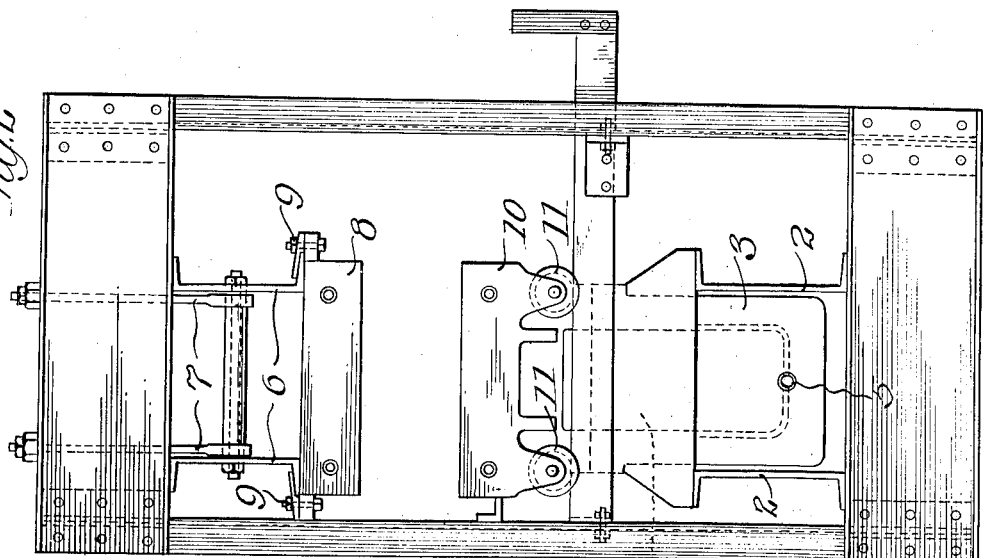

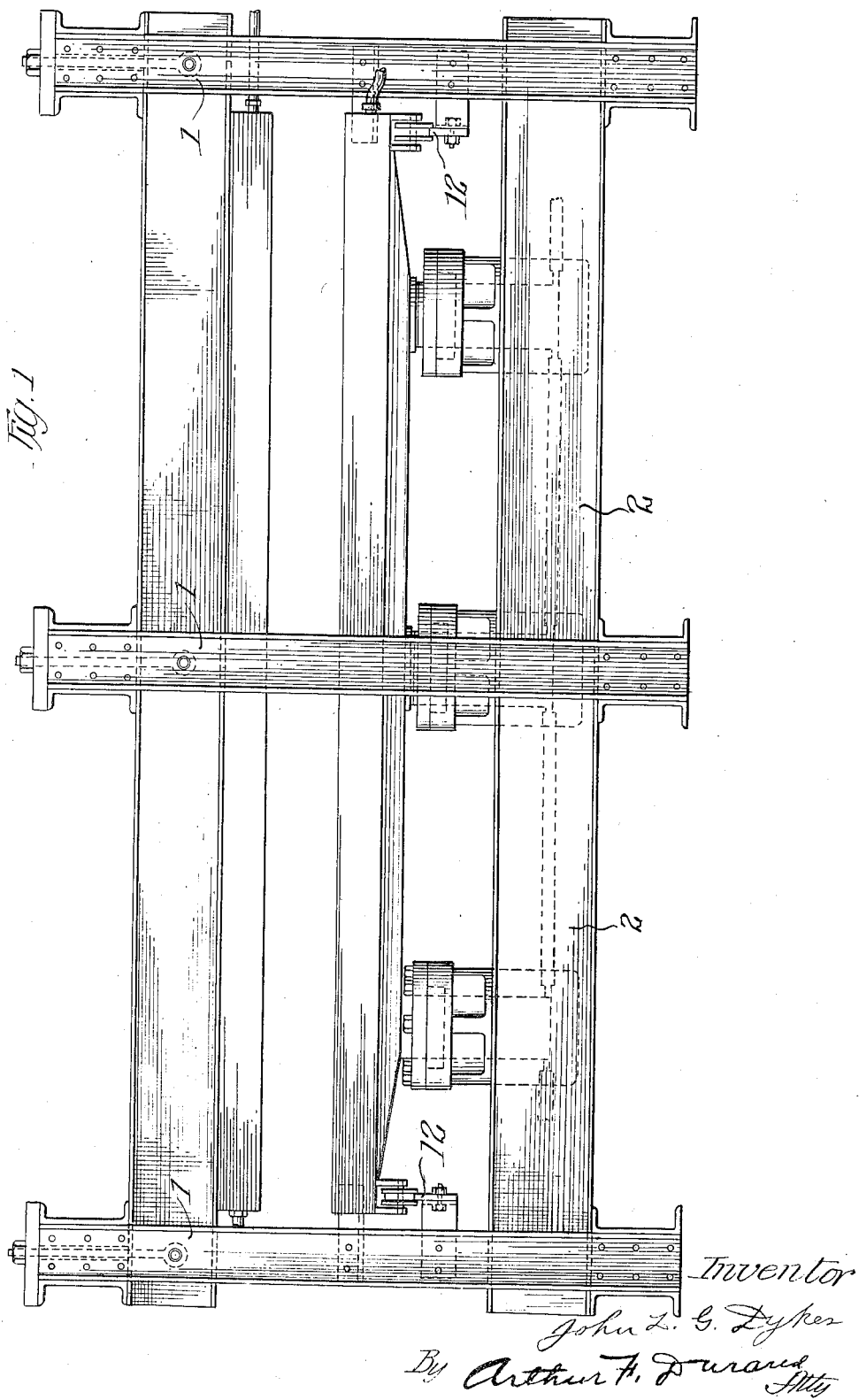

Sept. 30, 1924.                                                               1,509,938
J. L. G. DYKES
PROCESS FOR MAKING RUBBER TIRE ARTICLES AND THE LIKE
Filed Sept. 25, 1919        6 Sheets-Sheet 3
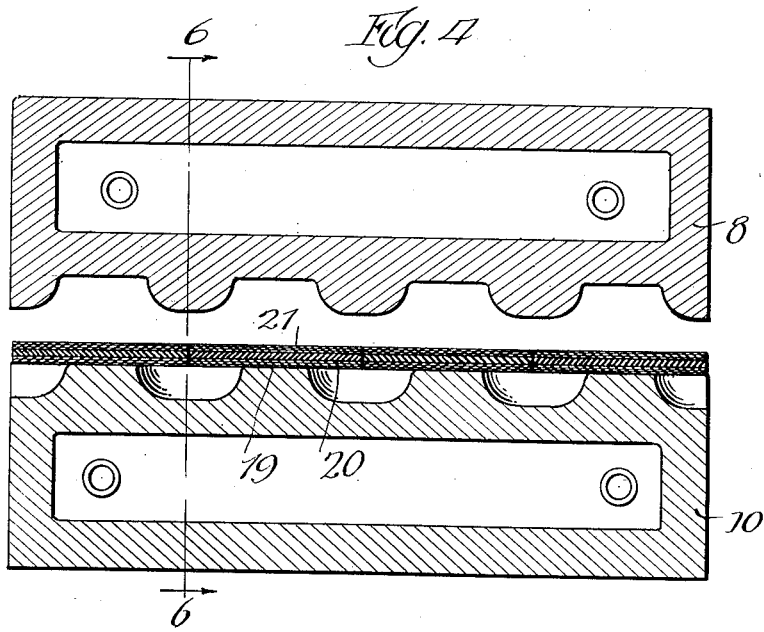
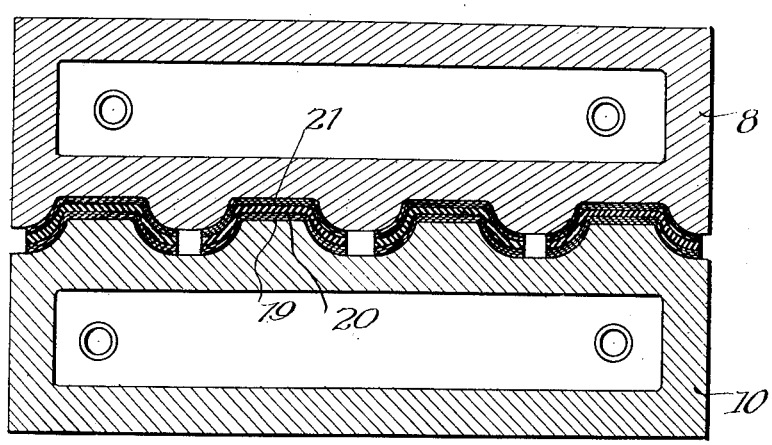
Inventor
John L. G. Dykes
By Arthur H Durand
Atty Sept. 30, 1924.                                        1,509,938
                    J. L. G. DYKES
     PROCESS FOR MAKING RUBBER TIRE ARTICLES AND THE LIKE
                  Filed Sept. 25, 1919        6 Sheets-Sheet 4
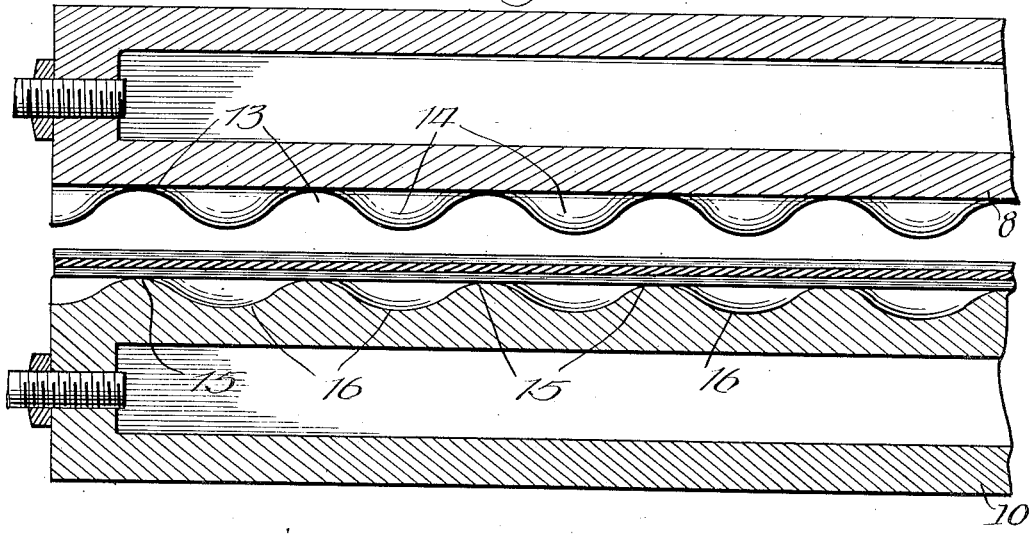
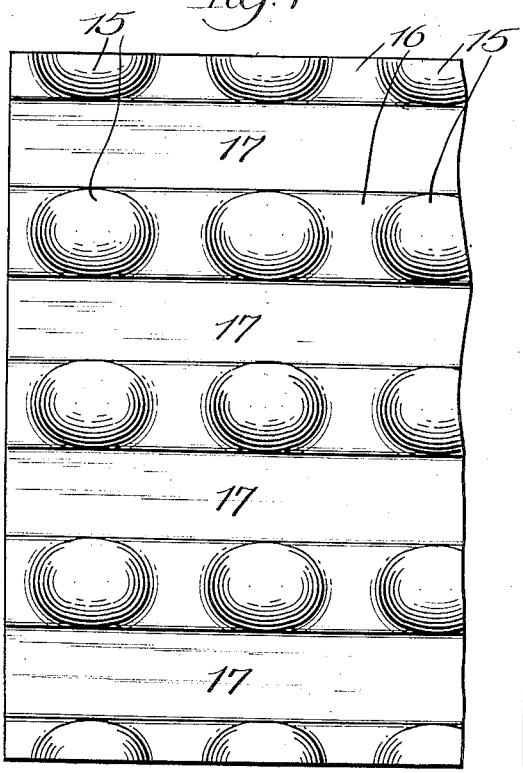
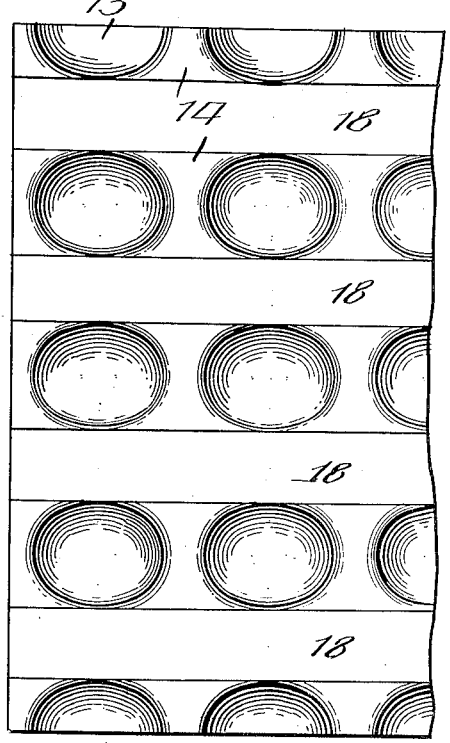
Inventor
John L. G. Dykes
By Arthur F. Durand Atty.

Sept. 30, 1924.  1,509,938
J. L. G. DYKES
PROCESS FOR MAKING RUBBER TIRE ARTICLES AND THE LIKE
Filed Sept. 25, 1919   6 Sheets-Sheet 5

Inventor
John L. G. Dykes
By Arthur H. Durand
Atty.

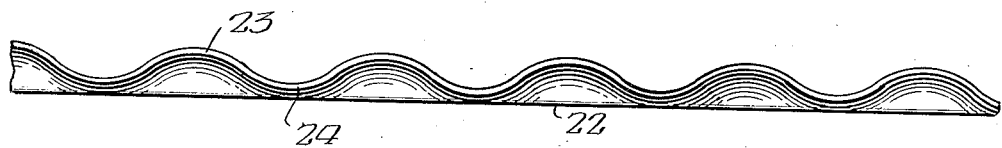
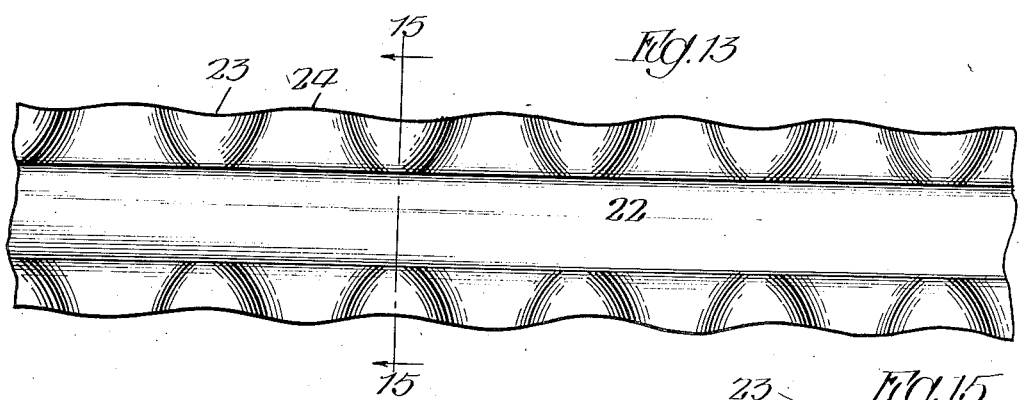
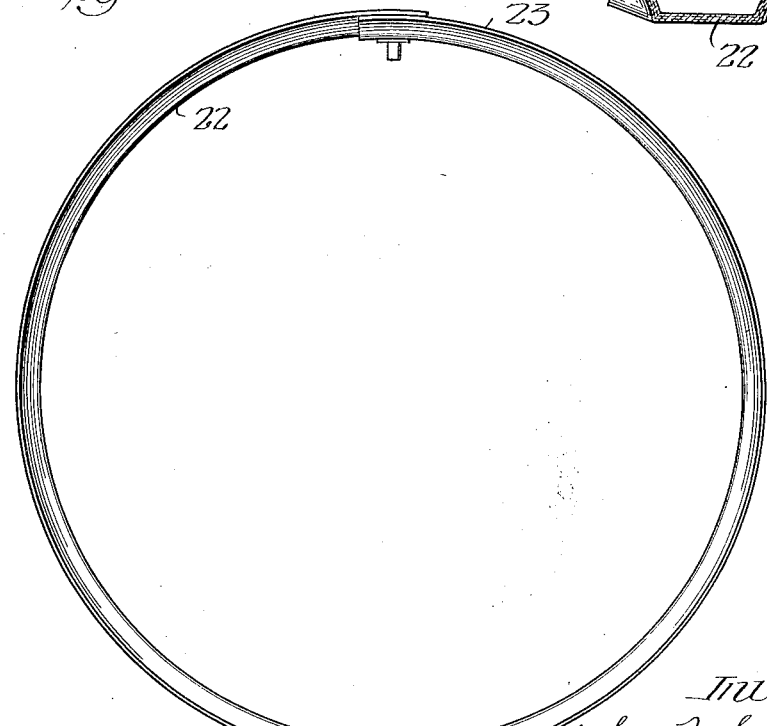

Patented Sept. 30, 1924.

1,509,938

UNITED STATES PATENT OFFICE.

JOHN L. G. DYKES, OF CHICAGO, ILLINOIS, ASSIGNOR TO DYKES TIRE MACHINERY COMPANY, OF WASHINGTON, DISTRICT OF COLUMBIA, A CORPORATION OF DELAWARE.

PROCESS FOR MAKING RUBBER-TIRE ARTICLES AND THE LIKE.

Application filed September 25, 1919. Serial No. 326,194.

*To all whom it may concern:*

Be it known that I, JOHN L. G. DYKES, a citizen of the United States of America, and a resident of Chicago, Illinois, have invented a certain new and useful Improvement in a Process for Making Rubber-Tire Articles and the like, of which the following is a specification.

This invention relates to the manufacture of inner flaps for pneumatic tire casings, or for similar purposes, and contemplates the production of such a flap, or a similar article, by the stretching of a flat strip or band along its edges, thereby to cause the strip or band to become dished or concaved in cross section. Ordinarily, of course, a pneumatic tire flap of this character is interposed between the inner tube and the rim of the wheel, and when in use is of annular or ring-like form with its edges of greater diameter than its middle portion, inasmuch as the latter is at the bottom or base of the tire, while said edges are disposed some distance therefrom at the sides of the tire. As stated, therefore, in practicing the invention, the strip of rubberized fabric, or several superimposed strips of fabric, forming a straight length of material of the proper thickness, is suitably stretched along the edges thereof, so that when the strip of one or several thicknesses is reduced to hoop-like form by connecting its ends together, it will be dished or concaved in cross section, as the edge portions are of greater diameter than the middle portion. In this way, the flap is caused to conform to the interior of the tire casing, and is more satisfactory in use than a nonconforming flap, or one which is liable to pucker or not lie smoothly. Of course, the invention can be practiced by first forming an endless flat band of rubberized fabric of one or more thicknesses or plies, and by then stretching the edge portions of this cylindric band, in any suitable manner, so that the edges assume a greater diameter, whereby the band in cross section assumes substantially the shape required for it when employed in the pneumatic tire. Preferably, however, the flap is made from a long straight length of rubberized fabric, of one or more thicknesses or layers, the edges of the strip being stretched in a press, and the long straight strip then being vulcanized; thereafter the ends of the strip are joined together, in a suitable manner, and incorporated in the pneumatic tire casing to form the base flap thereof, which prevents the inner tube from making direct contact with the channel rim of the wheel, in the well known manner.

The object of the invention, therefore, is to provide a method and apparatus for making pneumatic tire flaps, or similar articles, in a manner that will not only reduce or keep down the cost of production, but also in a way that will cause the flap to conform smoothly to the interior of the surface of the tire.

To these and other useful ends the invention consists in matters hereinafter set forth and claimed and shown on the accompanying drawings, in which—

Figure 1 is a front elevation of a press and vulcanizing machine for making pneumatic tire flaps in accordance with this invention.

Fig. 2 is an end elevation of said machine.

Fig. 3 is a vertical section of said machine, showing the position of the parts where the machine is in condition to be loaded.

Fig. 4 is an enlarged cross section of the upper and lower jaws or compression members of the machine, showing the same separated, and showing materials in position to be operated upon.

Fig. 5 is a similar view showing the jaws brought together to compress said materials.

Fig. 6 is a vertical section on line 6—6 in Fig. 4.

Figs. 7 and 8 are face views of portions of the upper and lower jaws of the machine.

Fig. 12 is a side elevation or edge view of the strip of material after it has been compressed and stretched by the two jaws of the machine, showing the corrugated or wavy formation given the two edges by the stretching operation.

Fig. 13 is a view looking down on the strip shown in Fig. 12.

Fig. 14 is a side elevation of the flap as it appears when finished, and when it assumes its annular or ring-like form, the undulations or corrugations along the edges being straightened out by this curvature of the strip.

Fig. 15 is a transverse section on line 15—15 in Fig. 13.

Figure 9:
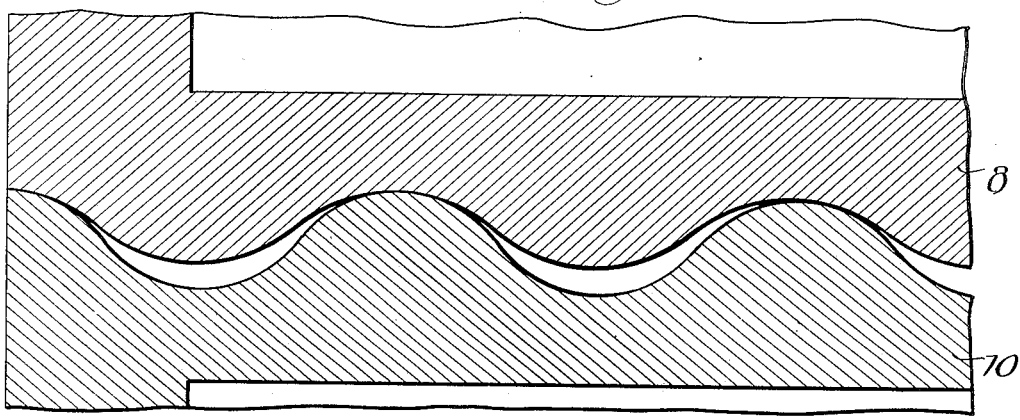
Fig. 9 is an enlarged detail section of a portion of the two jaws, showing the same without anything between them.

As thus illustrated, the machine comprises a body frame composed of upright members 1 disposed a suitable distance apart, and rigidly connected together by the channel irons or sills 2, the latter being spaced apart to accommodate the cylinders 3 and hydraulic plungers 4 between them, water pressure being admitted at 5, below each plunger, at the bottom of each cylinder, to raise the plungers. Channel irons 6 are suitably supported by eye-bolts 7 at the top of the machine. The upper jaw 8 of the machine is hollow, to receive steam for vulcanizing purposes, and is removably secured by bolts and washers 9 to the lower flanges of the channel iron 6, with the face of the jaw downward. The lower jaw 10 of the machine is also made hollow, so that it may be supplied with steam for vulcanizing purposes, but this jaw is provided with wheels 11 which travel on transverse tracks 12 rigidly secured to the body frame of the machine. In this way, the lower member or jaw 10 of the vulcanizing press can be loaded with the materials, while it is in the position shown in Fig. 3, and then pushed over the hydraulic plungers 4, so that the latter will raise this lower jaw to compress the materials between the two members or jaws.

The upper jaw is provided on its face or lower surface with depressions or hollows 13, which may be called the valleys, and with raised portions or hills 14 alternating therewith; the lower jaw is provided with similar hills and valleys 15 and 16, conforming more or less to the shape of the upper jaw, so that the two jaws are adapted to substantially fit together, the hills of one jaw entering the valleys or depressions of the other jaw. With a view to greater efficiency, and for the purpose of making a plurality of flaps at the same time, the jaws are shown as being wide enough to accommodate four parallel strips of fabric, the lower jaw having four parallel straight surfaces 17 along which the strips of fabric and rubber are laid, and between these straight smooth surfaces are the elevations or hills 15, in parallel rows, with the depressions or valleys between them. The upper jaw then has a corresponding number of straight parallel surfaces 18, with parallel rows of elevations or hills 14 and valleys 13, and with this construction each straight smooth surface is provided at each side thereof with a series of alternating hills and valleys. Straight strips of rubberized fabric, each strip composed of as many thicknesses as are necessary or desirable, are laid along these straight smooth surfaces 17, with the edges of the strips meeting midway between the straight surfaces 17, so that the edges of the strips overhang the hills and valleys.

Figure 10:
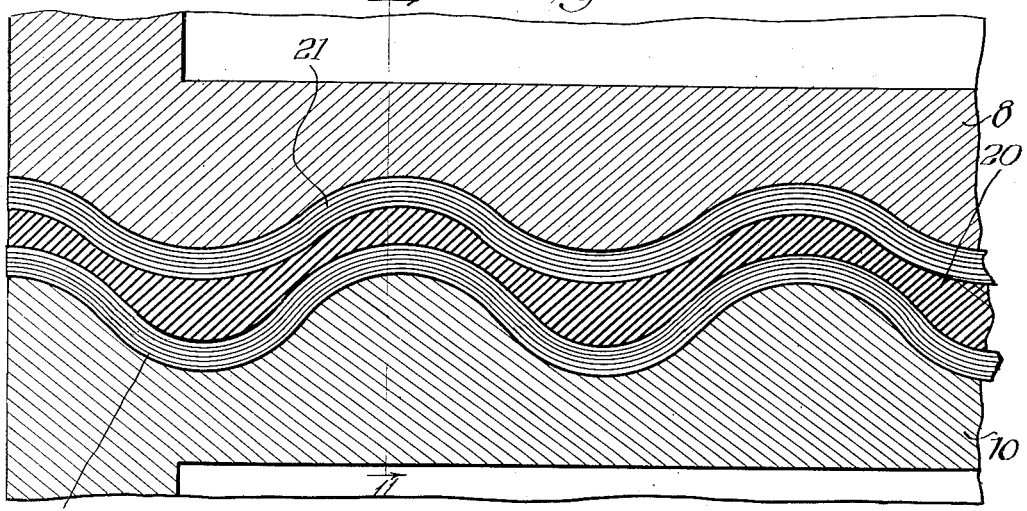
Fig. 10 is a similar view showing the materials between the two jaws.
Figure 11:
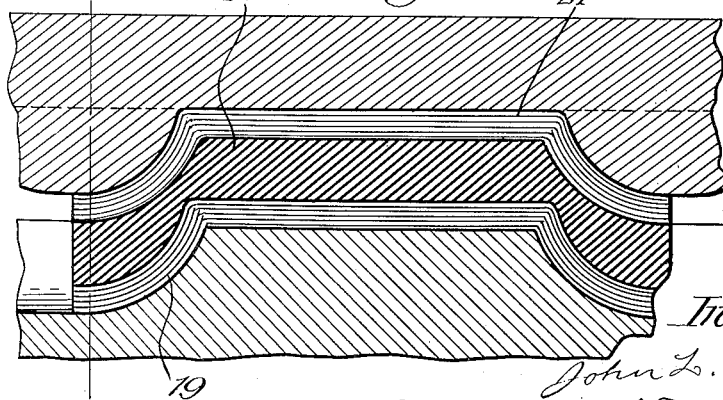
Fig. 11 is a section on line 11—11 in Fig. 10.

With the construction shown, there will thus be four strips of material 19 laid upon the lower jaw or member of the vulcanizing press. Then a soft rubber pad or blanket 20 is laid upon each strip, and then another strip of rubberized fabric 21 is placed on top, whereby eight strips are now in position to be stretched and vulcanized by the machine. Then when the hydraulic plungers 4 are raised, by the water pressure in the cylinders 3, the edge portions of each strip of fabric and rubber are stretched, so that they are given a fluted or corrugated or wavy formation, as shown in Figs. 12 and 13, the result being that these edges have been increased in length by the stretching operation. The rubber pad or blanket 20 will yield and allow the upper and lower strips to conform to the hills and valleys of the upper and lower jaws, as shown in Figs. 10 and 11, and after the rubber pad or blanket 20 is once vulcanized, by the first operation, it will then retain the formation necessary to enable it to conform to the hills and valleys or elevations and depressions of the two jaws of the vulcanizing press.

This produces a long straight strip having the straight and smooth center portion 22 extending longitudinally thereof, and having the elevations and depressions 23 and 24 in the edge portions thereof, so that when the strip is bent into ring form the said corrugations or compound curves formed by the wavy formation will be straightened out as shown in Fig. 14, whereby the annulus thus provided is concave or trough-like in cross section at any point in the circumference thereof; for, as previously stated, the edges of the strip have been stretched to a greater length, so that they may have the greater diameter which they must assume when the flap is curved into annular form; these edges then being on the lines of circles of greater diameter than the circle of the base portion 22 of the flap. The two ends of the strip are joined together in any suitable manner or in any manner known to the art, as will be readily understood. One side edge of the flap is secured to the inner surface of the tire casing, in the usual and well known manner, by cementing or by vulcanizing the flap to the tire, so that the flap will conform to the interior of the tire casing and rest upon the channel rim of the wheel, between the sides or edges of the casing, thereby supporting the inner tube in the ordinary or well known manner.

Thus the flap which must eventually assume an annular form is first made in the shape of a straight strip, with corrugations or undulations along the edges thereof, and is then bent around into ring-like form, which facilitates and reduces the cost of the manufacture of these flaps, or of similar articles. Therefore, the invention involves the formation of a trough-like strip, with the edges fluted or corrugated, and the bending of the said strip into annular form to straighten out the corrugations and thereby permit the flaring side portions of the trough-like strip to lie flatwise and smoothly against the inner sides of the tire casing, when the flap is in use. The exact formation of the hills and valleys or elevations and depressions on the opposing faces of the two jaws is not important, inasmuch as any formation which will produce the fluting or wavy formation along the edges of the multiply rubberized fabric strip will serve the purpose. Also, the distance between the two fluted side portions of the strip may be varied, the essential requirement being that the center or middle portion of the strip be allowed to remain unstretched, so that it will retain its original length, thus giving the diameter for the base of the flap which is necessary to enable this portion to be seated in the space between the two edges of the tire casing, and against the metal channel rim of the wheel. As shown, however, these hills and valleys are preferably of such formation that they do not have abrupt corners or sharp edges, but are more or less rounded everywhere to prevent injury to the rubberized fabric, so that only easy curves will be formed in the strip, in the manner shown. In some cases it will be possible to superimpose several strips and rubber pads or blankets, so that a considerable number of the strips with fluted edges can be produced at the same time; and, of course, the two jaws or opposed members of the vulcanizing press can be made even wider than those shown in the drawings, so as to accommodate a still greater number of parallel strips, thus giving the machine greater capacity. There are other articles, of course, of similar character, so that the invention is not limited to the production of a pneumatic tire casing flap; but the invention is found to be useful in the manufacture of flaps of this character, as they can be produced with less expense than with other methods, and are found to be capable of conforming smoothly to the interior of the tire casing when in use, whereby an entirely satisfactory article is produced at less cost than is possible with other methods heretofore employed for this purpose.

What I claim as my invention is:—

1. The process of making an article of the class described, comprising the stretching of sheet material along the edge thereof without stretching the body of the material inside said stretched edge portion, to permit curvature of said material with the edge extending outwardly of the curve.

2. The process specified in claim 1, both edges of the material being stretched, whereby the curvature of the material produces a trough-like formation of the article in cross-section, leaving the base of the trough unstretched.

3. The process specified in claim 1, in which said stretching is accomplished by fluting the edge portion of the material, while the sheet is spread out flatwise, and in which the curvature thereafter serves to eliminate the ruffle from said edge.

4. The process specified in claim 1, in which both edges of the material are stretched by fluting the edge portions while the sheet is spread out flatwise, and in which the curvature thereafter eliminates the ruffle from both edges and leaves the article annular in form and trough-like in cross section.

5. As an article of manufacture, a strip having a straight central portion and fluted edges to form the sides of an inner flap for a pneumatic tire casing.

6. In the method of making inner flaps for pneumatic tires, the fluting of the edge portions of superposed layers of sheet material to stretch the edges, having the straight middle portion unstretched with interposing yielding material between the layers, and compressing the layers together, so that stretching pressure is communicated through each flap to the other.

Signed

JOHN L. G. DYKES.